(12) United States Patent
Tenerz et al.

(10) Patent No.: US 11,033,446 B2
(45) Date of Patent: Jun. 15, 2021

(54) BACKSTOP AND GEAR-SHIFT ARRANGEMENT FOR A WHEELCHAIR WHEEL

(71) Applicant: GEARWHEEL AB, Västerås (SE)

(72) Inventors: Lars Tenerz, Uppsala (SE); Nils Didner, Uppsala (SE); Fredrik Preinitz, Uppsala (SE)

(73) Assignee: GEARWHEEL AB, Västerås (SE)

( * ) Notice: Subject to any disclaimer, the term of this patent is extended or adjusted under 35 U.S.C. 154(b) by 349 days.

(21) Appl. No.: 16/324,252

(22) PCT Filed: Aug. 16, 2017

(86) PCT No.: PCT/EP2017/070775
§ 371 (c)(1),
(2) Date: Feb. 8, 2019

(87) PCT Pub. No.: WO2018/033575
PCT Pub. Date: Feb. 22, 2018

(65) Prior Publication Data
US 2019/0183699 A1 Jun. 20, 2019

(30) Foreign Application Priority Data
Aug. 17, 2016 (SE) .................... 1630194-7

(51) Int. Cl.
*A61G 5/10* (2006.01)
*A61G 5/02* (2006.01)
*B62M 11/04* (2006.01)
(52) U.S. Cl.
CPC ............ *A61G 5/1086* (2016.11); *A61G 5/022* (2013.01); *A61G 5/1054* (2016.11); *B62M 11/04* (2013.01)

(58) Field of Classification Search
CPC ...... A61G 5/1086; A61G 5/022; A61G 5/023; A61G 5/024; A61G 5/1054; B62M 11/04; B62M 11/16
(Continued)

(56) References Cited

U.S. PATENT DOCUMENTS

| 4,045,047 A | 8/1977 | Buckley |
| 6,755,430 B1 | 6/2004 | Watwood et al. |

(Continued)

FOREIGN PATENT DOCUMENTS

| CA | 2 095 681 A1 | 11/1994 |
| DE | 42 11 338 A1 | 10/1993 |

(Continued)

*Primary Examiner* — Minnah L Seoh
*Assistant Examiner* — Hosam Shabara
(74) *Attorney, Agent, or Firm* — Foley & Lardner LLP

(57) ABSTRACT

A wheel assembly comprising a wheelchair wheel (5) and a backstop arrangement (10; 30; 70) configured to selectively engage and disengage a backstop function and comprising a backstop selector (15; 35; 75) and a backstop member (18; 38; 78), wherein the wheel (5) comprises an internal-gear wheel hub (11; 31; 71) comprising a number of internal gears (57, 58) and having an inner rotatable circumferential surface (13; 33; 73), and wherein the backstop member is configured to allow the inner circumferential surface to rotate in one direction and to prevent rotation in the opposite direction. The wheel assembly comprises further a gear-shift arrangement comprising a shift member (54), which is axially moveable within the internal-gear hub (31) to engage a specific gear of said number of internal gears (57, 58), and wherein the shift member (54) via a connector member (55) is operatively connected to the backstop selector.

9 Claims, 6 Drawing Sheets

(58) Field of Classification Search
USPC ...................................................... 280/250.1
See application file for complete search history.

(56) References Cited

U.S. PATENT DOCUMENTS

| | | |
|---|---|---|
| 7,124,858 B2 | 10/2006 | Ikegami et al. |
| 8,931,796 B2 | 1/2015 | Nasser |
| 10,179,076 B2 | 1/2019 | Didner et al. |
| 2012/0231922 A1 | 9/2012 | Byun |

FOREIGN PATENT DOCUMENTS

| | | |
|---|---|---|
| SE | 538008 C2 | 10/2015 |
| WO | WO 94/20323 A1 | 9/1994 |
| WO | WO 2015/167387 A1 | 11/2015 |

BACKSTOP AND GEAR-SHIFT ARRANGEMENT FOR A WHEELCHAIR WHEEL

FIELD OF THE INVENTION

The present invention relates to a combined backstop and gear-shift arrangement used in a wheelchair wheel, and particularly to a combined backstop and gear-shift arrangement for a wheelchair wheel, wherein a selectively engageable backstop mechanism is incorporated in a combined backstop and gear-shift arrangement.

BACKGROUND OF THE INVENTION

It is becoming increasingly more common for wheelchair wheels to be provided with gears in order to facilitate the use of wheelchairs by different users, especially when travelling on surfaces having varying gradients. This is especially the case for wheelchair wheels intended to be used on manually powered wheelchairs. These manually powered wheelchairs are propelled, steered and braked by a user by either turning or gripping a ring attached to each of the two main wheels of the wheelchair. By providing a gear mechanism between the gripping ring and the wheelchair wheel, the rotational speed of the gripping ring can differ from the rotational speed of the wheelchair wheel, which, for example, enables the user to reduce or increase the number of gripping ring actions for travelling a given distance.

The advantages of providing a wheelchair wheel with a gear mechanism have been recognized in several patents and patent applications. For example, the Swedish Patent No. 538008 to Didner et al. and the corresponding International Patent Publication No. WO2015167387 disclose a gear-shift arrangement comprising an internal-gear hub, which comprises a number of internal gears, a shift member, and a gear selector for selectively engage a specific gear of the number of internal gears.

Another mechanical feature that assists a wheelchair user is the backstop mechanism. A wheelchair wheel provided with a backstop mechanism allows the wheelchair user to, for example, rest a while before he or she starts a new gripping ring action without risking that the wheelchair rolls in a backward direction. A backstop mechanism is particularly useful when the user travels uphill, and a backstop arrangement for a wheelchair wheel is therefore also sometimes referred to as a hill-holder mechanism. Many of the known backstop or hill-holder arrangements are, however, permanently or automatically engaged and/or cannot be engaged unless the wheelchair wheel is brought to a standstill. A disadvantage with an engaged backstop mechanism whose backstopping function is not utilized—i.e. when the wheelchair is continuously moving forward—is that the backstop mechanism then adds to the amount of energy necessary to propel the wheelchair. An engaged backstop mechanism is also typically more subjected to wear than a disengaged backstop mechanism.

In the U.S. Pat. No. 7,124,858 to Ikegami et al., an exemplifying wheel assembly for a wheelchair is disclosed, which comprises a brake in the form of a brake shoe that can be used as a backstop. The backstop function can be selectively engaged and disengaged by a wheelchair user. The wheel assembly disclosed in this patent has no means for gear shifting.

A similar, exemplifying arrangement is shown in the U.S. Pat. No. 4,045,047 to Buckley, wherein a backstop mechanism comprises a roller, which in an engaged position is wedged between two surfaces to prevent rotation in one direction. The roller can be selectively engaged and disengaged by a wheelchair user. Also this arrangement has no means for gear shifting.

The U.S. Pat. No. 6,755,430 to Watwood et al. discloses a wheelchair drive mechanism having a transmission providing forward, rearward and neutral movement through maneuvering of a drive arm. When the drive mechanism is in a particular gear (i.e. forward gear or rearward gear), motion in the opposite direction is prevented by a specially arranged pinion, and when the neutral gear is selected, freewheeling or motion in forward or backward directions is allowed. The wheelchair drive mechanism disclosed in this patent has no means for shifting between forward gears having different gear ratios.

A propulsion system for a wheelchair is presented in the U.S. Pat. No. 8,931,796 to Nasser et al. Embodiments of the propulsion system comprise one or more planetary gears, and a wheelchair user shifts gear by rotating or pulling a gear-shift lever. The propulsion system can further be provided with a backstop mechanism in the form of a ratcheting mechanism, which a user selectively can engage or disengage by rotating an anti-rollback lever arranged at the wheel hub. In this system, the gear-shift mechanism and the backstop mechanism are operated as separate functions by two separate levers.

A backstop mechanism, which sometimes is referred to as a hill-holder mechanism, for a wheelchair wheel is typically engaged by a wheelchair user when he or she—while using the gear with lowest available gear ratio—has traveled a distance uphill and is in a more or less exhausted state, to prevent the wheelchair from rolling backwards in case he or she no longer is able to maintain the forward motion. It is therefore paramount that the backstop mechanism is easy to engage with a familiar operation that requires a minimum of force. In this respect, the known backstop and gear-shift arrangements can be improved.

The object of the present invention is therefore to provide an improved backstop and gear-shift arrangement for a wheelchair wheel, which arrangement both allows shifting between gears having different gear ratios and a selective engagement of a backstop function. The backstop and gear-shift arrangement should further be easy to operate in a reliable and user-friendly way.

SUMMARY OF THE INVENTION

The above-mentioned objects are achieved by the present invention according to the independent claims. Preferred embodiments are set forth in the dependent claims.

The present invention is based on the insight about the close relation between the engagement of a backstop function and the use of the lowest available gear in a geared wheel assembly. That is, when a wheelchair user travels uphill, he or she typically engages the lowest available gear, i.e. the gear having the lowest gear ratio, and when he/she becomes tired and no longer is confident that a forward motion can be maintained, the backstop function, if available, is engaged, to thereby provide the possibility for the wheelchair user to rest between muscle-based propulsion actions without risking that the wheelchair rolls backwards and downhill. In a sense, an engaged backstop function can therefore be regarded as a supplement to the lowest available gear. Alternatively, an engaged backstop function can even be regarded as the lowest available gear, i.e. the lowest available gear is the gear having the lowest gear ratio and an engaged backstop function, while the second lowest available gear is the gear having the lowest gear ratio and a disengaged backstop function. The present invention reflects this connection between a gear-shift mechanism and a backstop mechanism by providing an arrangement wherein the engagement of a backstop function is performed with the same type of maneuvering that is used for shifting gears.

The invention relates to a wheel assembly comprising a wheel for a wheelchair and a backstop arrangement, the wheel being provided with a wheel hub and a wheel axle, the backstop arrangement being configured to selectively engage and disengage, respectively, a backstop function, the backstop arrangement comprising a backstop selector and a backstop member, wherein the wheel hub has an inner rotatable circumferential surface, which faces the wheel axle and is arranged with a radial space therefrom, and the backstop selector is operatively connected to the backstop member, which is radially moveable within the radial space, to, upon movement of the backstop selector, be selectively engaged with or disengaged from the inner circumferential surface, and wherein the backstop member is configured, when in engagement with the inner circumferential surface, to allow the inner circumferential surface to rotate in a first direction and to prevent the inner circumferential surface from rotating in a second, opposite direction, wherein the wheel assembly further comprises a gear-shift arrangement and the wheel hub is an internal-gear hub comprising a number of internal gears, and the gear-shift arrangement comprises a shift member, which is axially moveable within the internal-gear hub to engage a specific gear of said number of internal gears, and wherein the shift member via a connector member is operatively connected to the backstop selector.

By this arrangement, the backstop arrangement is effectively a gear-shift and backstop arrangement and the backstop selector is effectively a gear and backstop selector, which allows a wheelchair user to engage a backstop function with the same familiar type of movement that was used to shift between gears, i.e. the engagement of a backstop function is done with the same type of rotational movement that was used to shift, e.g., from a higher gear to the lowest available gear.

The backstop arrangement can accomplish the backstop function in a reliable way by utilizing a cam curve, and in one embodiment, the backstop selector comprises a base portion comprising a contour, which extends a circumferential distance in the base portion and which comprises at least two positions with different radial distances from the wheel axle, and the backstop arrangement comprises a sliding element, which can slide in the contour, to, upon movement of the backstop selector, be positioned in one of said at least two positions, and wherein the sliding element is operatively connected to the backstop member.

The gear-shift arrangement can accomplish the gear-shift function in a reliable way by also utilizing a cam curve, and in an embodiment, the backstop selector comprises a second cam curve having a number of fixed positions having different radial distances and wherein a shift member is connected to a sliding element which can slide in the second cam curve by movement of the backstop selector.

In one embodiment of the invention, a backstop arrangement comprises a ratcheting mechanism, which in a further embodiment is arranged such that the inner circumferential surface is provided with teeth and the backstop member comprises a pivotally arranged rod having a first end portion configured to, upon movement of the backstop selector, be in contact with said teeth, wherein the rod is configured such that the teeth of the inner rotatable circumferential surface are dragged over the first end portion of the rod when the inner circumferential surface rotates in a first direction and wherein one tooth abuts the first end portion of the rod when the inner circumferential surface rotates in a second, opposite direction, and wherein the rod comprises a second end portion, which is connected to the sliding element, and wherein the backstop arrangement further comprises a spring, which is connected to the first end portion of the rod and strives to push the first end portion towards the inner circumferential surface or is connected to the second end portion of the rod and strives to pull the second end portion away from the inner circumferential surface. Such a ratcheting mechanism is a simple and reliable way of providing a backstop function.

In an another embodiment of the invention, the backstop arrangement comprises a freewheel mechanism, and is in a further embodiment arranged such that the inner circumferential surface is provided with teeth and the backstop member comprises a pivotally arranged rod having a first end portion provided with a cogged freewheel and being configured such that, upon movement of the backstop selector, the cogged freewheel is engaged with said teeth, wherein the cogged freewheel permits the inner circumferential surface to rotate in a first direction and prevents the inner circumferential surface from rotating in a second, opposite direction, and wherein the rod comprises a second end portion, which is connected to the sliding element, and wherein the backstop arrangement further comprises a spring, which is connected to the first end portion and strives to push the cogged freewheel towards the inner circumferential surface or is connected to the second end portion and strives to pull the second end portion away from the inner circumferential surface. A freewheel mechanism of this type allows a quick engagement of the backstop function and a freewheel is also less exposed to wear than, for example, a ratcheting mechanism.

In another embodiment of the invention, the backstop function is accomplished by a roller, and the backstop arrangement comprises a support structure provided with an inclined recess, which together with the inner circumferential surface forms a space that narrows towards the inner circumferential surface and wherein the backstop member comprises a rotatable roller, which is arranged in the narrowing space and is connected to a spring, which strives to push the rotatable roller towards the inner circumferential surface, and wherein the sliding element constitutes a central axle for the rotatable roller. Because of their robust constructions, a roller and an inclined recess provide a very durable backstop mechanism.

As used herein, the term "forward direction", when used in relation to the rotation of a wheel, refers to the rotational direction that moves a wheelchair provided with the wheel in question in a forward direction; and, similarly, the term "backward direction", when used in relation to the rotation of a wheel, refers to the rotational direction that moves a wheelchair provided with the wheel in question in a backward direction, or alternatively the rotational direction that would have moved the wheelchair in a backward direction if the backstop arrangement had not prevented such motion.

The backstop arrangement according to the present invention is to be used in a geared wheelchair wheel, and embodiments of the invention will be described with reference to such a geared wheelchair wheel. In particular when used in combination with the gear-shift arrangement disclosed in the aforementioned patent publication WO2015167387, the benefits of the present backstop arrangement are advantageously exploited, because then a backstop selector is advantageously combined with a gear selector, such that a combined backstop and gear selector is provided; and the user can then repeat or continue the manoeuvre which was used to select a specific, preferably the lowest gear to—if he or she so wishes—also engage a backstop mechanism.

BRIEF DESCRIPTION OF THE DRAWINGS

FIGS. 2a, 2b and 2c illustrate schematically a first embodiment of a backstop arrangement according to the invention, which has been combined with a gear selector arrangement, in a first position, wherein FIG. 2a shows a sectional view of a wheel hub with a combined backstop and gear selector removed, FIG. 2b shows a sectional view of the wheel with a combined backstop and gear selector, and FIG. 2c shows a corresponding cross-section of the wheel hub with internal gears and a shift member.

FIGS. 3a and 3b illustrate schematically a second embodiment of a backstop arrangement according to the invention in a first position, wherein FIG. 3a shows a sectional view of a wheel hub with a backstop selector removed and FIG. 3b shows a sectional view of the wheel hub with a backstop selector.

FIGS. 4a and 4b illustrate schematically a third embodiment of a backstop arrangement according to the invention in a first position, wherein FIG. 4a shows a sectional view of a wheel hub with a backstop selector removed and FIG. 4b shows a sectional view of the wheel hub with a backstop selector.

DETAILED DESCRIPTION OF PREFERRED EMBODIMENTS

Figure 1:
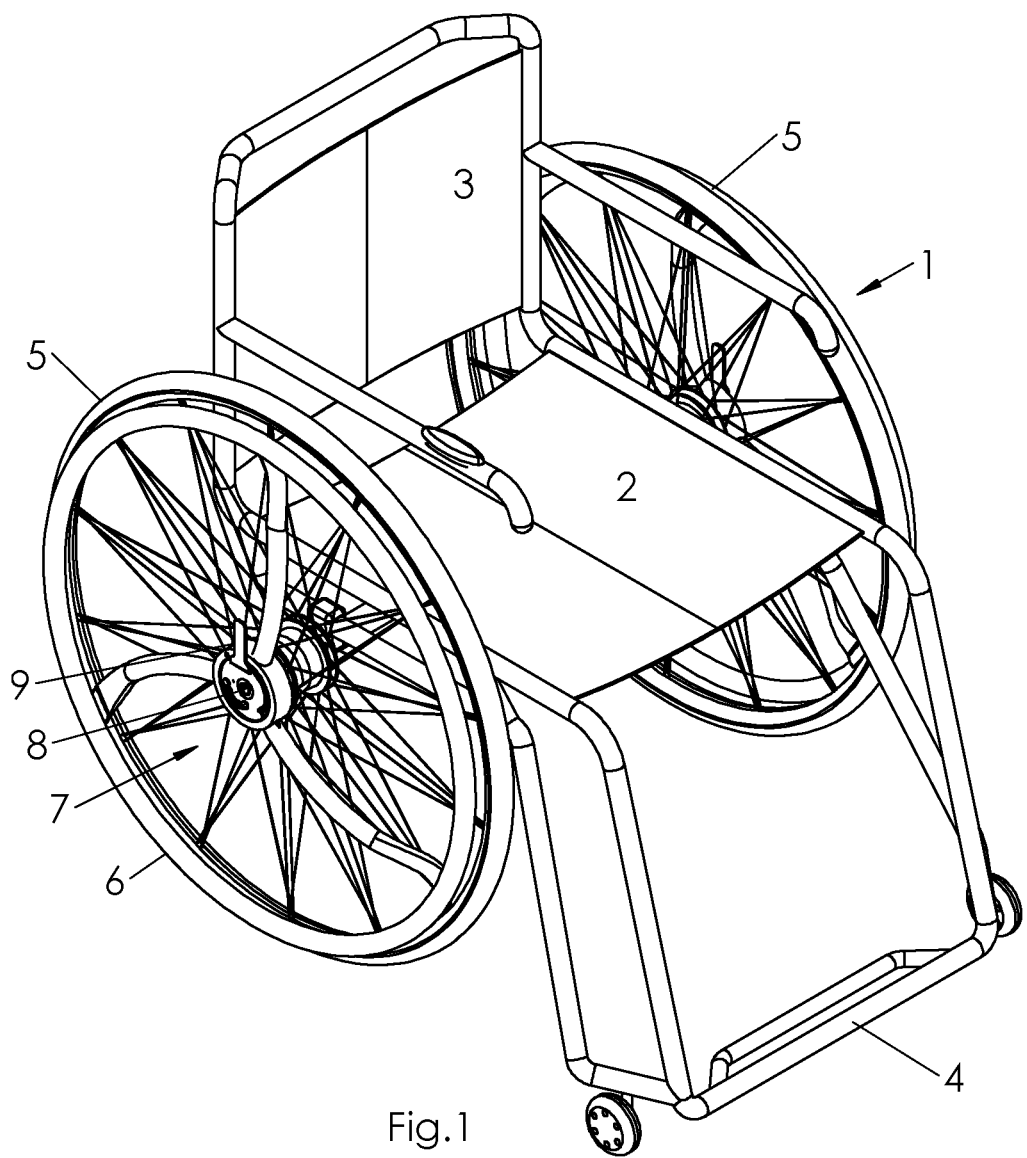
FIG. 1 illustrates schematically a wheelchair with a wheel provided with a backstop arrangement according to the present invention.

The present invention relates to a wheelchair and more specifically to the main driving wheels of a wheelchair. An exemplifying wheelchair is depicted in FIG. 1, wherein a wheelchair 1 essentially comprises a seat 2, a back 3, a foot support 4, and two wheels 5. Each of the two wheels 5 is provided with an outer gripping ring 6 and an internal backstop arrangement 7. In FIG. 1 only one of the two backstop arrangements 7 is visible. By providing the wheels 5 with backstop arrangements 7, a wheelchair user can rest without risking that the wheelchair 1 moves backwards, which is a feature that is extremely helpful when, for example, travelling uphill. As will be demonstrated below, the backstop arrangement 7 is selectively engageable, which provides the advantages of a backstop function without impairing the user's ability to, e.g., maneuver the wheelchair 1 in narrow spaces and without preventing the user from moving backwards when the user so wishes, something which is more or less necessary when, for example, negotiating an obstacle such as a pavement edge or a curb. A selectively engageable backstop arrangement 7 has also positive effects on the amount of energy needed to propel the wheelchair 1 and reduces the wear of the backstop arrangement 7, as was explained above.

Still with reference to FIG. 1, the backstop arrangement 7 comprises further a wheel hub 8 with a wheel axle (not visible in the figure) and a backstop selector 9, which, due to the present invention, effectively works as a combined gear and backstop selector 9. As will be seen and explained below, a combination of a backstop arrangement, such as backstop arrangement 7, and a gear-shift arrangement provides several advantages; and in such a case the wheel hub 8 is preferably an internal-gear hub 8 comprising a planetary gear system, which as such is well-known in the art.

Suitable internal-gear hubs are, for example, commercially available from the company Sturmey-Archer, e.g. the model S3X.

In FIGS. 2a-2h, a first embodiment of a backstop arrangement according to the present inventions is illustrated. This embodiment shows both a backstop arrangement and illustrates how a backstop arrangement can be integrated into and combined with a gear-shift arrangement.

Figure 2A:
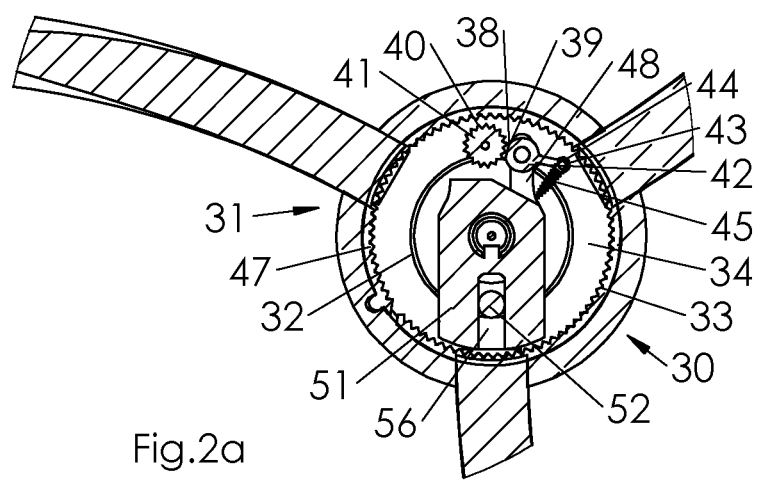
Figure 2B:
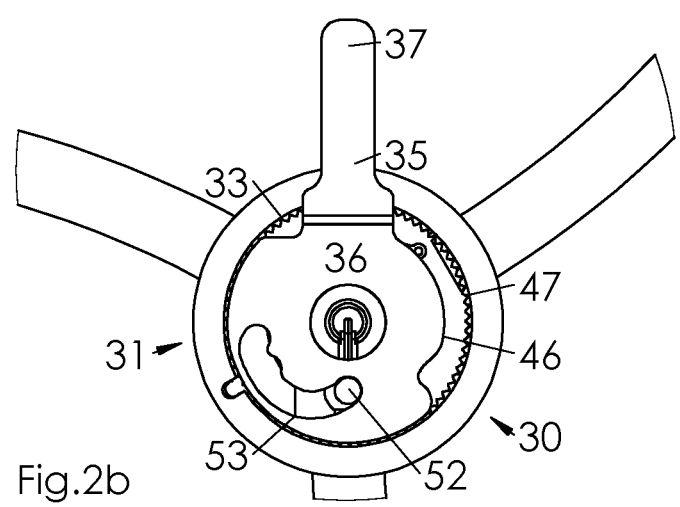
Figure 2C:
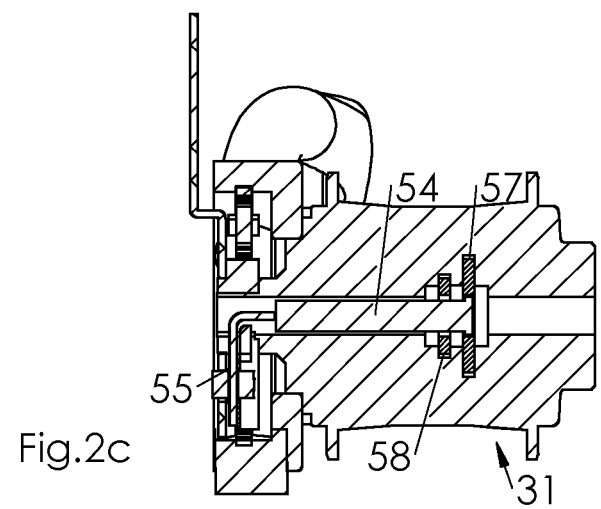
Figure 2D:
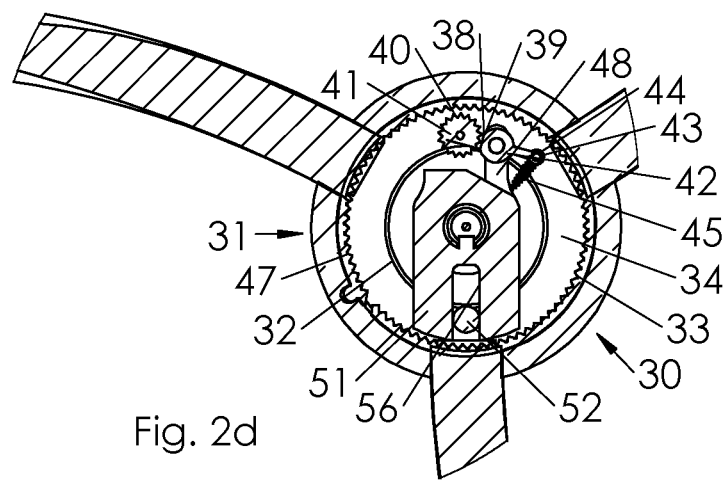
FIGS. 2d, 2e and 2f show the backstop arrangement according to FIGS. 2a, 2b and 2c, respectively, in a second position.
Figure 2E:
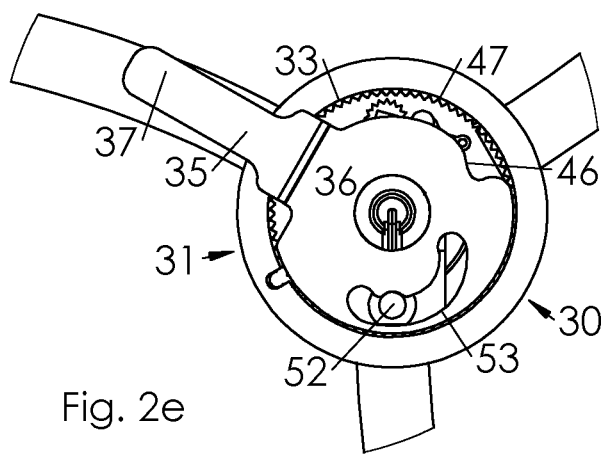
Figure 2F:
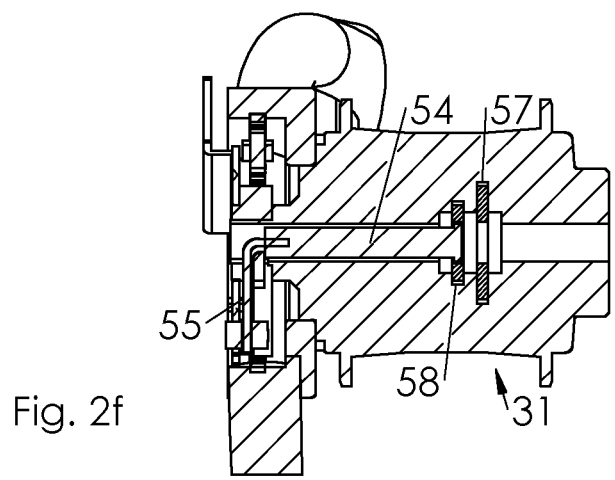
Figure 2G:
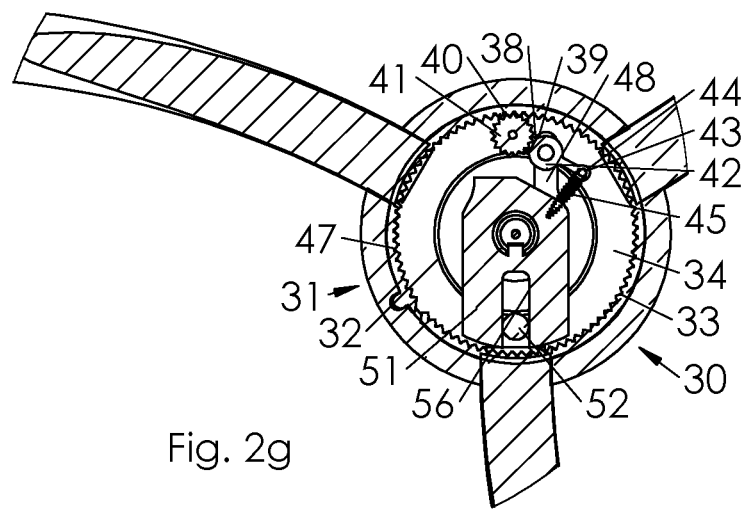
FIGS. 2g and 2h show the backstop arrangement according to FIG. 2a and FIG. 2b, respectively, in a third position.
Figure 2H:
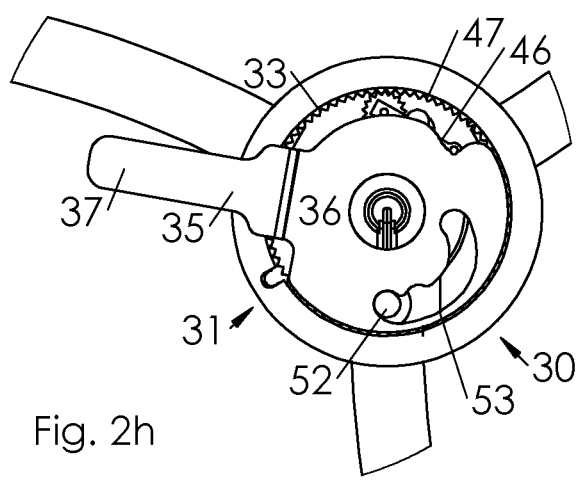

Focusing first on the backstop function of this embodiment, FIGS. 2d and 2e as well as FIGS. 2g and 2h show a first embodiment of a backstop arrangement 30, which is arranged at a wheel hub 31, which comprises a wheel axle 32 and has an inner circumferential surface 33, which faces the wheel axle 32 and is arranged with a radial distance from the wheel axle 32, such that a radial circumferential space 34 is provided between the wheel axle 32 and the inner circumferential surface 33. The inner circumferential surface 33, which alternatively can be arranged as an attachable inner ring or cylinder 33, is rotatable in both clockwise direction and counter-clockwise direction when the backstop arrangement 30 is not engaged, and is, when the backstop arrangement 30 is engaged, only rotatable in a counter-clockwise direction (as seen in the figures), which will be explained and demonstrated below. As depicted in FIGS. 2d-2e and 2g-2h, a counter-clockwise direction corresponds to a forward direction for a wheelchair provided with a wheel comprising the backstop arrangement 30. The backstop arrangement 30 comprises further an axially movable backstop selector 35, which is axially movably attached to the wheel axle 32 and has a lower or inner base portion 36 and an upper or outer portion in the shape of a handle 37. The backstop arrangement 30 comprises further a backstop member 38, which is pivotally arranged on a support structure 48 in the radial space 34 provided between the wheel axle 32 and the inner rotatable surface 33, and is in this embodiment essentially a rod 39 having a first end portion 40 provided with a small cogged freewheel 41 and a second end portion 42 provided with a sliding element 43 in the form of a pin 44, which in FIGS. 2a-2b, 2d-2e and 2g-2h extends towards the viewer.

The second end portion 42 of the pivotally arranged backstop member 38 is attached to a stretched spring 45, which strives to pull the second end portion 42 inwardly and which, because of the pivotal arrangement of the backstop member 38, simultaneously strives to push the first end portion 40 outwardly, such that the small cogged freewheel 41 comes into contact with the inner circumferential surface 33. The base portion 36 of the backstop selector 35 comprises a first or upper contour 46, on which the sliding element 43 slides, i.e. the pin 44 follows the upper contour 46 as the backstop selector 35 is moved axially by a user who wishes either to engage the backstop function or disengage the backstop function. The upper contour 46 may alternatively be regarded and referred to as the upper cam curve 46, since it has the controlling function typically associated with a cam curve.

In FIG. 2d and FIG. 2e, the backstop member 38 is schematically illustrated in a disengaged position; and more particularly, in FIG. 2d the backstop selector 35 has been removed to more clearly show the operation of the backstop member 38, while the backstop selector 35 is present in FIG. 2e to show the functioning of the upper contour 46 in the base portion 36 of the backstop selector 35 in combination with the sliding element 43.

From FIG. 2d it can be seen that the inner circumferential surface 33 is provided with a number of teeth 47 and that the stretched spring 45 strives to pull the second end portion 42 of the rod 39 inwardly and thereby simultaneously strives to force the small cogged freewheel 41, which is rotatably arranged at the first end portion 40 of the rod 39, into engagement with the teeth 47 arranged on the inner circumferential surface 33. From FIG. 2e it can be seen that the upper contour 46 has a circumferential shape with varying radial distance to the wheel axle 32; and in the disengaged position depicted in FIG. 2e, the sliding element 43, which here is in the form of the pin 44, is resting on the upper contour 46 at a position where there is a relatively long radial distance to the wheel axle 32, such that the second end portion 42 is forced to remain at a relatively long distance from the wheel axle 32, and simultaneously such that the small cogged freewheel 41, which is arranged at the first end portion 40 of the rod 39, is prevented from coming into engagement with the teeth 47 of the inner circumferential surface 33.

In the engaged position illustrated in FIG. 2g and FIG. 2h, a wheelchair user has moved the backstop selector 35 axially in a circumferential direction, such that the sliding element 33, i.e. the pin 34, has followed the upper contour 46 and is now in a position in the upper contour 46 with a relatively shorter distance to the wheel axle 32. This means that the spring 45 now is able to pull the small cogged freewheel 41, which is rotatably arranged at the first end portion 40 of the pivotally arranged rod 39, into engagement with the teeth 47 of the inner circumferential surface 33. The small cogged freewheel 41 can rotate in a first direction and is locked in a second, opposite direction. Such freewheels are known in the art, and are, for example, commercially available from the company Schaeffler. The interior functioning of the freewheel 41 will therefore not be described herein. Thus, when the cogged freewheel 41 is in engagement with the teeth 47 of the inner circumferential surface 33, the circumferential surface 33 can rotate in a first direction as permitted by the cogged freewheel 41, while the circumferential surface 33 is prevented to rotate in a second, opposite direction as prevented by the cogged freewheel 41. Apparently, a first direction corresponds to a forward direction for a wheelchair having a wheel provided with the backstop arrangement 30, while a second, opposite direction corresponds to a backward direction for a wheelchair having a wheel provided with the backstop arrangement 30. It should further be understood that a spring, such as spring 45, can optionally be arranged as a compressed and pushing spring or a stretched and pulling spring by choosing attachment side of a pivotally arranged backstop member.

An advantage with the backstop arrangement 30, which is described in conjunction with FIGS. 2a-2h, is that the backstop arrangement 30 is very silent in operation. A freewheel, such as the small cogged freewheel 41, is also resistant to wear and can provide a direct and reliable action, because the cogged freewheel 41 is, when the backstop function is engaged, always in engagement with the teeth 41, such that the backstopping function immediately comes into action when the wheelchair attempts to go in a backward direction.

Focusing now on the gear-selection function of this first embodiment, FIGS. 2a-2c show the backstop selector 35, which, when combined with a gear-selection function, alternatively can be referred to as the gear and backstop selector 35, in a first position; and more precisely, in FIG. 2a the gear and backstop selector 35 has been removed to more clearly show the operation of a guide member 51 and a sliding element 52, while the gear and backstop selector 35 is present in FIG. 2b to show the functioning of a second or lower contour 53, which is provided as a cam curve 53 that extends a circumferential distance, in combination with the sliding element 52, and FIG. 2c shows how the gear-selecting function is executed by a shift member 54, which is located in the gear hub 31 and is connected to a connector member 55. The backstop arrangement 30, which, when combined with a gear-shift arrangement, can be referred to as the backstop and gear-shift arrangement 30, comprises the sliding element 52, which can slide radially within a guide slot 56 provided in the guide member 51 and can also move circumferentially within the lower cam curve 53. In the first position illustrated in FIGS. 2a-2c, the sliding element 52 is in a first position in the cam curve 53 and has in this position a relatively short radial distance to the wheel axle 32. FIG. 2c illustrates that in this first position, the shift member 54, which has a cogged outer surface, is in engagement with a first cogged internal gear 57. From FIGS. 2a and 2b it can also be inferred that in this position the upper contour 46 prevents the backstop member 38 (i.e. in this embodiment the small cogged freewheel 41) to come into engagement with the teeth 47 arranged at the inner circumferential surface 33, i.e. the backstop function is not engaged.

FIGS. 2d-2f show the backstop and gear-shift arrangement 30 in a second position, wherein a wheelchair user has moved the gear and backstop selector 35 axially to engage a second internal gear 58. More precisely, by axially moving the gear and backstop selector 35 in a counter-clockwise direction (as seen in FIG. 2e), the sliding element 52 has moved in the cam curve 53 into a position with a relatively longer distance to the wheel axle 32, as is best seen in FIG. 2d. By moving the gear and backstop selector 35 and thereby the sliding element 52, which is connected to the shift member 54 via the connector member 55, the shift member 54 has moved out of engagement with the first internal gear 57 and into engagement with a second internal gear 58. A connector member, such as connector member 55, which preferably is a flexible member, can be provided in the form of a chain or a wire. From FIG. 2e it can also be seen that in this position, the upper contour 46 still prevents the backstop member 38 (i.e. in this embodiment the small cogged freewheel 41) to come into engagement with the inner circumferential surface 33, i.e. the backstop function is still not engaged. In this exemplifying embodiment, only two internal gears are provided, but it should be understood that more internal gears can easily be arranged, and are engageable by a cam curve having more positions with different radial distances for a sliding element which slides within this cam curve.

Now, returning once again to FIGS. 2g and 2h, wherein a wheelchair user has moved the backstop and gear selector 35 to a third position, it can be appreciated that the sliding element 52 has assumed a third position in the cam curve 53, as seen in FIG. 2h. However, as seen in FIG. 2g, the radial distance for the sliding element 52 has not changed and is the same as in the second position shown in FIG. 2d. This means that the second internal gear 58 is still engaged, but now also the backstop function is engaged, as was thoroughly explained above. Thus, by moving the backstop and gear selector 35 back and forth in a circumferential direction, a wheelchair user can engage and disengage, respectively, a backstop function while still having the same gear engaged. It is believed that a selectively engageable backstop function is best utilized in combination with the lowest gear, when arranged in combination with a geared wheel hub, since the lowest gear available is presumably already selected and engaged under the circumstances in which a backstop function is most needed, such as when travelling uphill or maneuvering the wheelchair over obstacles.

Figure 3A:
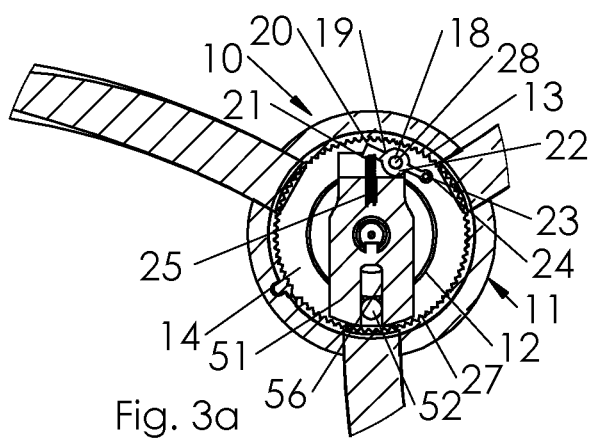
Figure 3B:
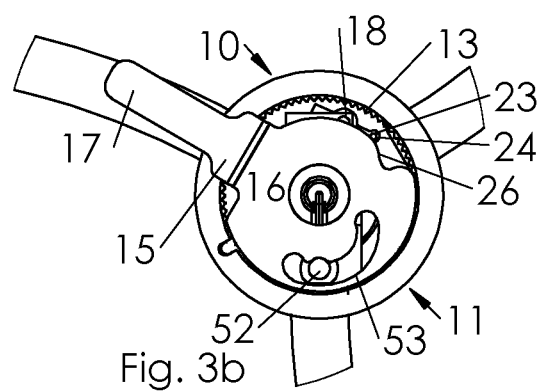
Figure 3C:
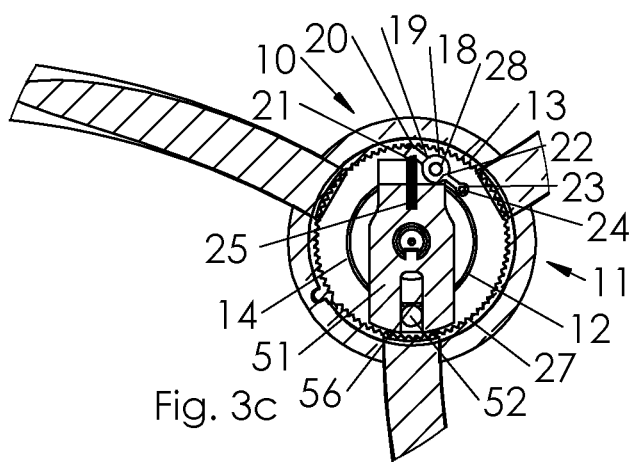
FIGS. 3c and 3d show the backstop arrangement according to FIG. 3a and FIG. 3b, respectively, in a second position.
Figure 3D:
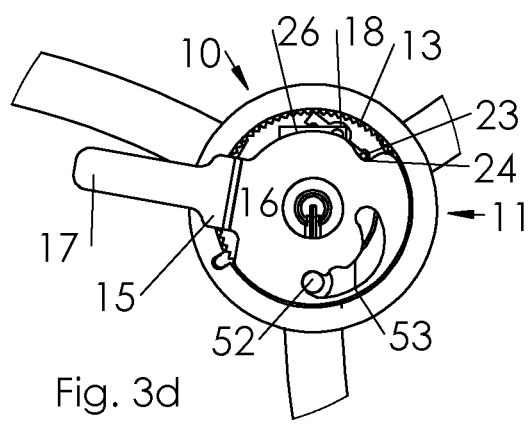

FIGS. 3a and 3b as well as FIGS. 3c and 3d show a second embodiment of a backstop arrangement 10, which is arranged at a wheel hub 11, which comprises a wheel axle 12 and has an inner circumferential rotatable surface 13, which faces the wheel axle 12 and is arranged with a radial distance from the wheel axle 12, such that a radial circumferential space 14 is provided between the wheel axle 12 and the inner circumferential surface 13. The inner circumferential surface 13, which alternatively can be arranged as an attachable inner ring or cylinder 13, is rotatable in both clockwise direction and counter-clockwise direction when the backstop arrangement 10 is not engaged, and is, when the backstop arrangement 10 is engaged, only rotatable in a counter-clockwise direction (as seen in the figures), which will be explained and demonstrated below. As depicted in FIGS. 3a-3d, a counter-clockwise direction corresponds to a forward direction for a wheelchair provided with a wheel comprising the backstop arrangement 10. The backstop arrangement 10 comprises further an axially movable backstop selector 15, which is axially movably attached to the wheel axle 12 and has a lower or inner base portion 16 and an upper or outer portion in the shape of a handle 17. The backstop arrangement 10 comprises further a backstop member 18, which is pivotally arranged on a support structure 28 in the radial space 14 provided between the wheel axle 12 and the inner circumferential surface 13, and is in this embodiment essentially a rod 19 having a first end portion 20 comprising a lip 21 and a second end portion 22 provided with a sliding element 23 in the form of a pin 24, which in FIGS. 3a-3d extends towards the viewer. The lip 21 at the first end portion 20 of the pivotally arranged rod 19 is attached to a compressed spring 25, which strives to push the first end portion 20 outwardly, i.e. towards and into contact with the inner circumferential surface 13, and which, because of the pivotal arrangement of the rod 19, simultaneously strives to push the second end portion 22 inwardly. The base portion 16 of the backstop selector 15 comprises a contour 26, on which the sliding element 23 slides, i.e. the pin 24 follows the contour 26 as the backstop selector 15 is moved axially in a circumferential direction by a user who wishes either to engage the backstop function or disengage the backstop function.

The contour 26, which extends a circumferential distance in the base portion 16, can alternatively be regarded and referred to as a cam curve 26, since it has the controlling function typically associated with a cam curve.

In FIG. 3a and FIG. 3b, the backstop member 18 is schematically illustrated in a first position; and more precisely, in FIG. 3a the backstop selector 15 has been removed to more clearly show the operation of the backstop member 18, while the backstop selector 15 is present in FIG. 3b to show the functioning of the contour 26 provided in the base portion 16 of the backstop selector 15 in combination with the sliding element 23.

From FIG. 3a it can be seen that the inner circumferential surface 13 is provided with a number of teeth 27 and that the compressed spring 25 strives to push the first end portion 20 of the backstop member 18 into contact with the teeth 27 arranged on the inner circumferential surface 13, and that, at the same time, the spring 25 strives to force the second end portion 22 of the pivotally arranged backstop member 18 inwardly. From FIG. 3b it can be seen that the contour 26 has a circumferential shape with varying radial distance to the wheel axle 12; and in the first position depicted in FIG. 3b, the sliding element 23, which here is arranged in the form of the pin 24, is resting on the contour 26 at a position where there is a relatively long radial distance to the wheel axle 12, such that the second end portion 22 of backstop member 18, which here is arranged in the form of the rod 19, is forced to remain at a relatively long distance from the wheel axle 12, and, simultaneously, such that the first end portion 20 of the backstop member 18 is prevented from coming into engagement with the teeth 27 of the inner circumferential surface 13.

In the second position illustrated in FIG. 3c and FIG. 3d, a wheelchair user has moved the backstop selector 15 axially in a circumferential direction, such that the sliding element 23, i.e. the pin 24, has followed the contour 26 and is now in a position in the contour 26 having a relatively shorter distance to the wheel axle 12. This means that the spring 25 now is able to push the first end portion 20 of the pivotally arranged backstop member 18, which here is arranged as the rod 19, into engagement with the teeth 27 of the inner circumferential surface 13. And since the rod 19 is arranged with an inclination to the circumferential surface 13, the teeth 27 can slip over the lip 21 at the first end portion 20 of the rod 19 when the circumferential surface 13 rotates in a first direction (in FIG. 3c, in a counter-clockwise direction), but when the circumferential surface 13 rotates—or rather tries to rotate—in a second, opposite direction (in FIG. 3c, in a clockwise direction), the lip 21 at the first end portion 20 abuts and locks with one tooth 27 of the toothed inner circumferential surface 13 and prevents rotation in this second direction. In other words, in this embodiment, the backstop member 18 works as a ratchet in combination with the tooted inner circumferential surface 13.

In the second embodiment of a backstop arrangement illustrated in FIGS. 3a-3d, it can be seen that the backstop function is combined with a gear-shift arrangement, which comprises a guide member 51, a sliding element 52, and a second or lower contour or cam curve 53. Thus, the wheel hub 11 is an internal-gear hub 11, and the function of the gear-shift arrangement is identical to the gear-shift arrangement that was thoroughly described above in conjunction with FIGS. 2a-2h. The gear-shift arrangement provided for the second embodiment described in conjunction with FIGS. 3a-3d will therefore not be further described, but it is to be understood that the backstop arrangement 10 comprises a gear-shift arrangement, and also the backstop arrangement 10 can be regarded as a gear-shift and backstop arrangement 10, and the backstop selector 15 can be regarded as a gear and backstop selector 15.

Figure 4A:
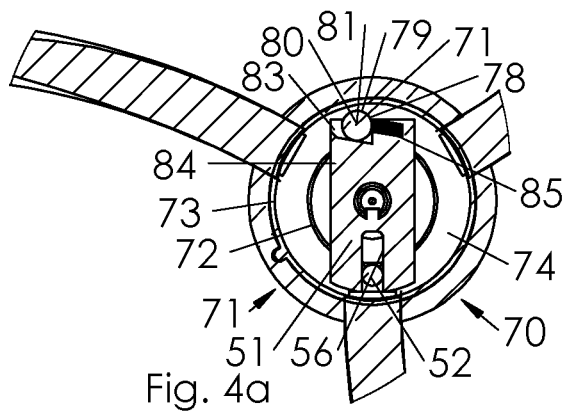
Figure 4B:
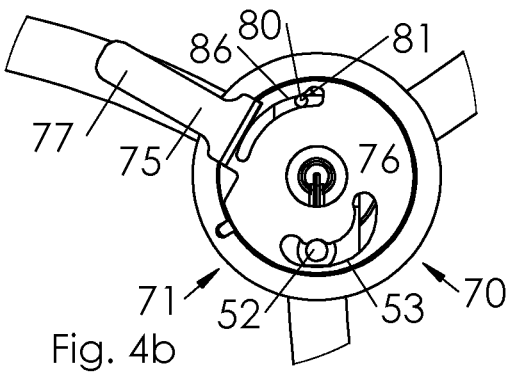
Figure 4C:
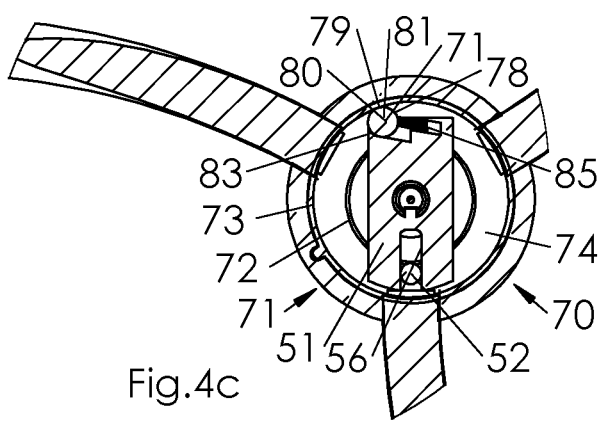
FIGS. 4c and 4d show the backstop arrangement according to FIG. 4a and FIG. 4b, respectively, in a second position.
Figure 4D:
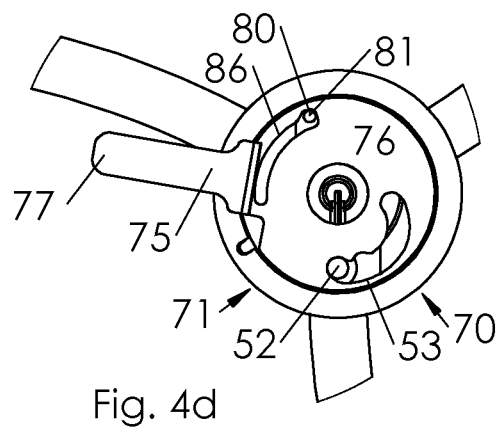

FIGS. 4a and 4b as well as FIGS. 4c and 4d show a third embodiment of a backstop arrangement 70, which is arranged at a wheel hub 71, which comprises a wheel axle 72 and has an inner circumferential rotatable surface 73, which faces the wheel axle 72 and is arranged with a radial distance from the wheel axle 72, such that a radial circumferential space 74 is provided between the wheel axle 72 and the inner circumferential surface 73. The inner circumferential surface 73, which alternatively can be arranged as an attachable inner ring or cylinder 73, is rotatable in both clockwise direction and counter-clockwise direction when the backstop arrangement 70 is not engaged, and is, when the backstop arrangement 70 is engaged, only rotatable in a clockwise direction (as seen in the figures), which will be explained and demonstrated below. As depicted in FIGS. 4a-4d, a counter-clockwise direction corresponds to a forward direction for a wheelchair provided with a wheel comprising the backstop arrangement 70. The backstop arrangement 70 comprises further an axially movable backstop selector 75, which is axially movably attached to the wheel axle 72 and has a lower or inner base portion 76 and an upper or outer portion in the shape of a handle 77. The backstop arrangement 70 comprises further a backstop member 78, which is arranged in the radial space 74 provided between the wheel axle 72 and the inner rotatable circumferential surface 73, and is in this embodiment a rotatable roller 79. The backstop arrangement 70 comprises further a sliding element 80, which is provided in the form of a central axle 81 for the rotatable roller 79. The central axle 81 has an end portion 82 (not seen in the figures), which faces the backstop selector 75 and extends outside the roller 79. The roller 79 is arranged in an inclined recess 83, which faces the inner circumferential surface 73 and is provided in a support structure 84. The roller 79 is further connected to a spring 85 and is arranged such that it can rotate and roll, i.e. move inwards and outwards, in the inclined recess 83. The shape of the inclined recess 83 is such that it together with the inner circumferential surface 73 creates a space which narrows towards the inner circumferential surface 73. That is, the spring-loaded roller 79 is free to rotate in a clockwise direction (as seen in the figures) and can then roll inwards (or at least strive to roll inwards against the action of the spring 85) within the space provided between the inclined recess 83 and the inner circumferential surface 73, but when the spring-loaded roller 79 rotates in a counter-clockwise direction (as seen in the figures) it rolls outwards and will, because of the narrowing space provided between the inclined recess 83 and the inner circumferential surface 73, eventually be wedged in and get stuck and lock with the inner circumferential surface 73, thereby preventing also the inner circumferential surface 73 from rotating in this direction. In other words, the spring-loaded roller 79 arranged in a narrowing recess constitutes together with the rotatable inner surface 73 an example of a conventional freewheel. The base portion 76 of the backstop selector 75 comprises a contour 86, which extends a distance in the circumferential direction and is arranged as a cam curve 86, into which the end portion 82 of the central axle 81 of the roller 79 reaches and in which the end portion 82 can slide. The cam curve 86 extends a circumferential distance in the base portion 76 and comprises two different radial distances to the wheel axle 72.

In FIG. 4a and FIG. 4b, the backstop member 78, i.e. the roller 79, is schematically illustrated in a first position; and more precisely, in FIG. 4a the backstop selector 75 has been removed to more clearly show the operation of the backstop member 78, while the backstop selector 75 is present in FIG. 4b to show the functioning of the cam curve 86 provided in the base portion 76 of the backstop selector 75 in combination with the sliding element 80.

From FIG. 4a it can be seen that the spring-loaded roller 79 is pressed inwards, i.e. into the inclined recess 83, and is not in contact with the inner circumferential surface 73. Hence, there is no backstop function engaged. From FIG. 4b, it can be appreciated that the sliding element 80 in this position is at a relatively short radial distance from the wheel axle 72, which—since the sliding element 80 constitutes the end portion 82 of the central axle 81 of the spring-loaded roller 79—prevents the roller 79 from acting as a freewheel.

In the second position illustrated in FIG. 4c and FIG. 4d, a wheelchair user has moved the backstop selector 75 axially in a circumferential direction, such that the sliding element 80 now is at relatively longer radial distance from the wheel axle 72. Since the sliding element 80 constitutes the end portion 82 of the central axle 81 of the spring-loaded roller 79, the roller 79 has in this position been forced into close contact with the inner circumferential surface 73, and is now, as was explained above, only able to rotate in a clockwise direction, i.e. to roll inwards (as seen in the figures), whereas the spring-loaded roller 79 will be wedged in and get stuck and lock with the inner surface 73 if the roller 79 attempts to rotate in a counter-clockwise direction. In other words, since it is the rotation and rotational direction of the inner circumferential surface 73 that drives and controls the rotation of the spring-loaded roller 79, the inner circumferential surface 73 is free to rotate in a clockwise direction (as seen in the figures) but is prevented to rotate in a counter clockwise direction (as seen in the figures). When the backstop arrangement 70 is arranged on a wheel attached to a wheelchair, the allowed rotational direction corresponds obviously to a forward direction for the wheelchair, while the prevented rotational direction corresponds to a backward direction for the wheelchair. In comparison with the small cogged freewheel provided in the second embodiment of the present invention, a freewheel function provided as a spring-loaded roller, which can rotate and roll in an inclined and narrowing recess and get into close contact with an inner circumferential surface, the latter freewheel is presumably more durable and reliable.

In the third embodiment of a backstop arrangement illustrated in FIGS. 4a-4d, it can be seen that the backstop function is combined with a gear-shift arrangement, which comprises a guide member 51, a sliding element 52, and a second or lower contour or cam curve 53. Thus, the wheel hub 71 is an internal-gear hub 71, and the function of the gear-shift arrangement is identical to the gear-shift arrangement that was thoroughly described above in conjunction with FIGS. 2a-2h. The gear-shift arrangement provided for the third embodiment described in conjunction with FIGS. 4a-4d will therefore not be further described, but it is to be understood that the backstop arrangement 70 comprises a gear-shift arrangement, and also the backstop arrangement 70 can be regarded as a gear-shift and backstop arrangement 70, and the backstop selector 75 can be regarded as a gear and backstop selector 75.

A common feature of all gear-shift arrangements presented herein is that a backstop selector, or, if applicable, a combined backstop and gear selector, does not rotate as a user propels a wheelchair. It is therefore easy for a user to locate the backstop selector when he or she wants to engage a backstop function. It should further be noted that all backstop arrangements disclosed herein can be engaged by wheelchair user while the wheelchair wheels still rotate, which is an advantage since no energy is wasted when a wheelchair user otherwise would have to bring the wheelchair to an unnecessary standstill. Wear of the backstop arrangement is also minimized since the backstop function is selectively engageable and is preferably only engaged when needed. Likewise, inherent and unavoidable energy losses due to friction, which arise when a backstop mechanism is engaged and the wheelchair is moving, are minimized as the backstop mechanism is selectively engageable and is preferably only engaged when needed. The incorporation of a backstop arrangement into a gear-shift arrangement should also be appreciated by a wheelchair user who prefers a user-friendly mechanism which is easy and intuitive to operate, wherein gear shifting and backstop engagement and backstop disengagement are executed with the same type of manual movement; and as the combined gear and backstop selector is arranged with a handle in a lever-arm arrangement, the force needed to change gear and to engage a backstop function is minimized, to thereby provide a maximum of user-friendliness and safety.

Although the present invention has been described with reference to specific embodiments, also shown in the appended drawings, it will be apparent to those skilled in the art that many variations and modifications can be done within the scope of the invention as described in the specification and defined with reference to the claims below.

The invention claimed is:

1. A wheel assembly comprising a wheel (5) for a wheelchair (1) and a backstop arrangement (10; 30; 70), the wheel (5) being provided with a wheel hub (11; 31; 71) and a wheel axle (12; 32; 72), the backstop arrangement (10; 30; 70) being configured to selectively engage and disengage, respectively, a backstop function, the backstop arrangement comprising a backstop selector (15; 35; 75) and a backstop member (18; 38; 78), wherein the wheel hub (11; 31; 71) has an inner rotatable circumferential surface (13; 33; 73), which faces the wheel axle (12; 32; 72) and is arranged with a radial space (14; 34; 74) therefrom, and the backstop selector (15; 35; 75) is operatively connected to the backstop member (18; 38; 78), which is radially moveable within the radial space (14; 34; 74), to, upon movement of the backstop selector (15; 35; 75), be selectively engaged with or disengaged from the inner circumferential surface (13; 33; 73), and that the backstop member (18; 38; 78) is configured, when in engagement with the inner circumferential surface (13; 33; 73), to allow the inner circumferential surface (13; 33; 73) to rotate in a first direction and to prevent the inner circumferential surface (13; 33; 73) from rotating in a second, opposite direction, wherein the wheel assembly further comprises a gear-shift arrangement and the wheel hub (11; 31; 71) is an internal-gear hub (11; 31; 71) comprising a number of internal gears (57, 58); the gear-shift arrangement comprises a shift member (54), which is axially moveable within the internal-gear hub (31) to engage a specific gear of said number of internal gears (57, 58), and wherein the shift member (54) via a connector member (55) is operatively connected to the backstop selector (15; 35; 75).

2. The wheel assembly according to claim 1, wherein the backstop selector (15; 35; 75) comprises a base portion (16; 36; 76) comprising a first contour (26; 46; 86), which extends a circumferential distance in the base portion (16; 36; 76) and which comprises at least two positions with different radial distances from the wheel axle (12; 32; 72), and the backstop arrangement (10; 30; 70) comprises a sliding element (23; 43; 80), which can slide in the contour (26; 46; 86), to, upon movement of the backstop selector (15; 35; 75), be positioned in one of said at least two positions, and wherein the sliding element (23; 43; 80) is operatively connected to the backstop member (18; 38; 78).

3. The wheel assembly according to claim 2, wherein a base portion (16; 36; 76) of the backstop selector (15; 35; 75) further comprises a second contour (53) having a number of fixed positions having different radial distances and wherein the shift member (54) is connected to a sliding element (52) which can slide in the second contour (53) by movement of the backstop selector (15; 35; 75).

4. The wheel assembly according to claim 1, wherein the backstop arrangement (10) comprises a ratcheting mechanism.

5. The wheel assembly according to claim 4, wherein the inner circumferential surface (13) is provided with teeth (27) and the backstop member (18) comprises a pivotally arranged rod (19) having a first end portion (20) configured to, upon movement of the backstop selector (15), be in contact with said teeth (27), wherein the rod (19) is configured such that the teeth (27) of the inner rotatable circumferential surface (13) are dragged over the first end portion (20) of the rod (19) when the inner circumferential surface (13) rotates in a first direction and wherein one tooth (27) abuts the first end portion (20) of the rod (19) when the inner circumferential surface (13) rotates in a second, opposite direction, and wherein the rod (19) comprises a second end portion (22), which is connected to a sliding element (23), and wherein the backstop arrangement (10) further comprises a spring (25), which is connected to the first end portion (20) of the rod (19) and strives to push the first end portion (20) towards the inner circumferential surface (13) or is connected to the second end portion (22) of the rod (19) and strives to pull the second end portion (22) away from the inner circumferential surface (13).

6. The wheel assembly according to claim 1, wherein the backstop arrangement comprises a freewheel mechanism.

7. The wheel assembly according to claim 6, wherein the inner circumferential surface (33) is provided with teeth (47) and the backstop member (38) comprises a pivotally arranged rod (39) having a first end portion (40) provided with a cogged freewheel (41) and being configured such that, upon movement of the backstop selector (35), the cogged freewheel (41) is engaged with said teeth (47), wherein the cogged freewheel (41) permits the inner circumferential surface (33) to rotate in a first direction and prevents the inner circumferential surface (33) from rotating in a second, opposite direction, and wherein the rod (39) comprises a second end portion (42), which is connected to a sliding element (43), and wherein the backstop arrangement (30) further comprises a spring (45), which is connected to the first end portion (40) and strives to push the cogged freewheel (41) towards the inner circumferential surface (33) or is connected to the second end portion (42) and strives to pull the second end portion (42) away from the inner circumferential surface (33).

8. The wheel assembly according to claim 2, wherein the backstop arrangement (70) comprises a support structure (84) provided with an inclined recess (83), which together with the inner circumferential surface (73) forms a space that narrows towards the inner circumferential surface (73) and wherein the backstop member (78) comprises a rotatable roller (79), which is arranged in the narrowing space and is connected to a spring (85), which strives to push the rotatable roller (79) towards the inner circumferential surface (73), and wherein the sliding element (80) constitutes a central axle (81) for the rotatable roller (79).

9. A wheelchair provided with a wheel assembly according to claim 1.

* * * * *